UNITED STATES PATENT OFFICE.

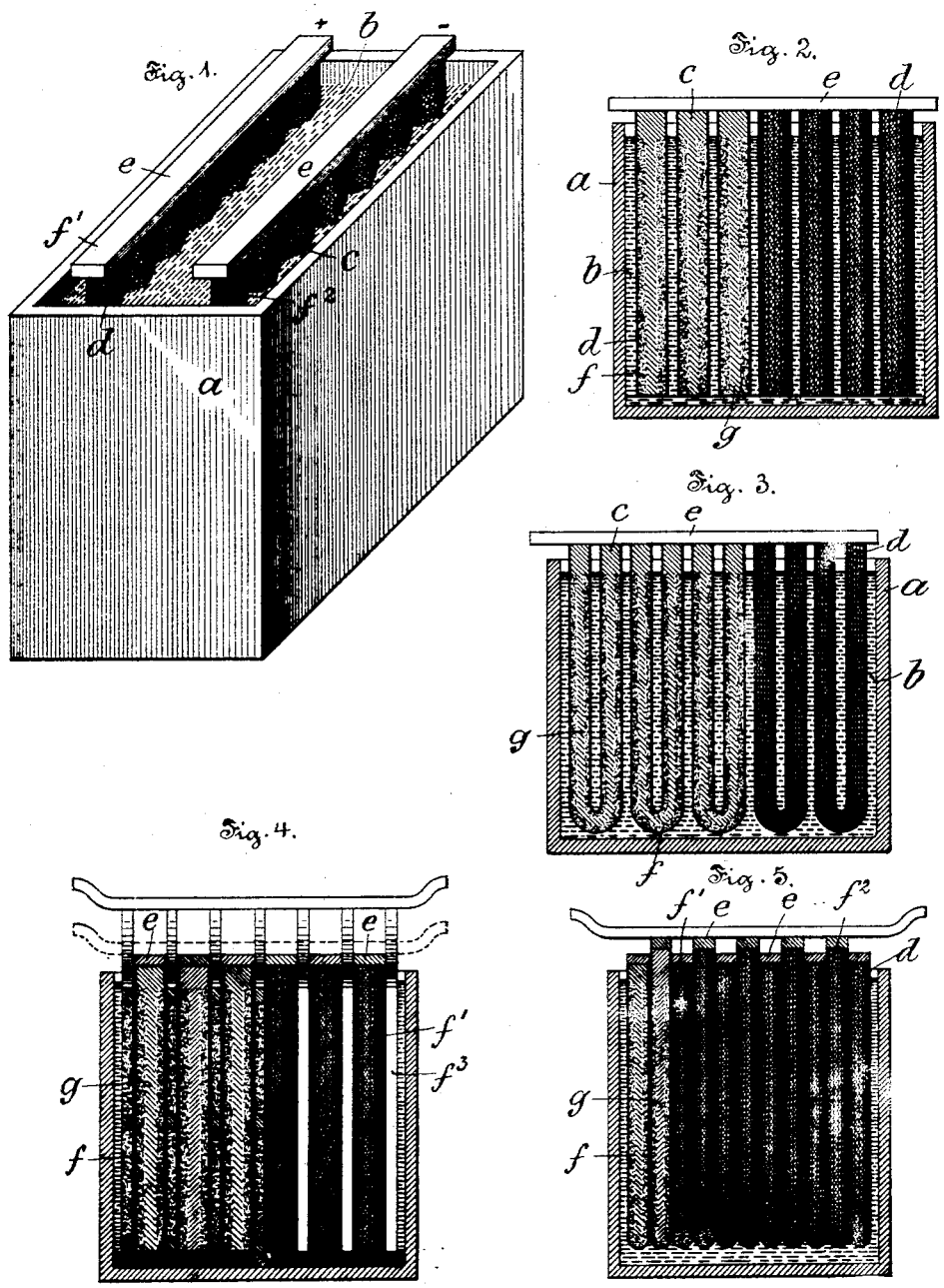

STANLEY CHARLES CUTHBERT CURRIE, OF PHILADELPHIA, PENNSYLVANIA, ASSIGNOR TO THE UNITED GAS IMPROVEMENT COMPANY, OF SAME PLACE.

SECONDARY BATTERY.

SPECIFICATION forming part of Letters Patent No. 453,995, dated June 9, 1891.

Application filed January 31, 1891. Serial No. 379,756. (No model.)

*To all whom it may concern:*

Be it known that I, STANLEY CHARLES CUTHBERT CURRIE, a subject of the Queen of Great Britain, but now residing at the city of Philadelphia, in the county of Philadelphia and State of Pennsylvania, have invented certain new and useful Improvements in Secondary or Storage Batteries, of which the following is a specification.

My invention relates to the plates or elements of a so-called "secondary" or "storage" battery.

Hitherto the methods generally employed for the manufacture of plates or elements of a secondary or storage battery have either been the purely electrolytic or Planté method or the mechanical method of applying, under pressure, lead oxides to a conducting frame or support.

My invention has relation to the former method, but embracing novel and important features and steps in connection with the same for the production of battery plates or elements.

The principle object of my present invention is to provide a cheap, durable, and efficient battery plate or element of any suitable shape or form adapted for use as a secondary or storage battery and a plate or element which will not disintegrate or possess the deleterious effects hitherto existing in the plates or elements of electric batteries.

My invention consists of a battery plate or element produced substantially in the manner hereinafter described and pointed out in the claims.

In order that my invention may be fully understood, a brief description will now be given of a general method of producing the same, and in that connection will be pointed out the particular characteristic features of of the battery plate or element so produced.

In the present invention the principal object is to convert or transform ordinary lead, cast or rolled, partially into a porous or soft spongy metallic state or condition by electrolysis for use as a battery element.

Heretofore the principal objections presented to the method of reducing a plate of lead or similar material by electrolytic action to a spongy metallic state or condition in a solution of dilute sulphuric acid has been the extreme length of time required to render the lead spongy or porous and of sufficient thickness or bulk for practical purposes. This method, as is well known, requires a number of reversals of the electric current so that it is impossible to attain the required result without a constant repetition of the treatment, the principal reason being that only the surface of the lead is oxidized at first; but just as soon as this small amount is fully oxidized the oxygen, being unable to be further taken up by the lead, escaped in the form of gas. This of course is the case when simple lead constitutes the elements and they are immersed in a bath composed of dilute sulphuric acid. I have discovered by a series of experiments that it is possible to penetrate into a plate or block of ordinary lead by electrolytic action in such a manner as that but one or two reversals of current are required, and that the lead can be quickly and effectually penetrated to the required depth; and, moreover, that the salt of lead into which such plate or block is converted in the first instance is brought to such a state or condition as to be readily reducible again to lead in a soft spongy or porous metallic condition, and afterward formed by the ordinary process or treatment with but one or two reversals.

The principle above defined forms the basis upon which my present invention is founded, and I adopt the line of action hereinafter prescribed for practically and efficiently carrying the same into effect for the production of a battery plate or element. For example, two plates or blocks of lead are immersed in a suitable liquid or bath and in a solution in which the lead is insoluble, the blocks or plates of lead being arranged therein as anodes and cathodes. An electric current is then passed, which causes, in a short period of time, the anode to be gradually but uniformly transformed to the required depth, forming thereby a layer or thick film of lead salt as a part thereof, and of such general character as experience has demonstrated may be quickly transformed by a simple reversal of current into porous metallic lead or to a spongy metallic state or condition for use as an element of a battery when mounted in a suitable electrolyte, such as dilute sulphuric acid, the element being formed therein in the ordinary manner. As the plate or element is thus produced in a porous or spongy condition, no constant reversals of current are required. The solution to mount the plate or block of lead in for its conversion in the first instance is preferably composed of chloride of zinc. ($ZnCl_2$.) It has been ascertained by practical experiment that if a current is passed from a lead anode to a lead cathode in a solution of zinc chloride, lead chloride is formed upon the surface and extends into the body thereof without any escape of gas, yet if the plate so treated was not otherwise protected, this lead chloride would fall to the bottom of the tank, thereby rendering the plate or block practically useless. To obviate such difficulty presented or disadvantageous feature arising, means have been devised, forming a part of the present invention, in which the lead chloride so formed is retained to the internal body of the plate or block without interfering in any manner with the converting or transforming steps of the process for the production of the battery element, this step being permitted according to my invention to continue under due regulation until the required depth of lead chloride is formed. As soon as the required depth of chloride surface has been obtained, which can be readily ascertained from the quantity of current permitted to pass, it is transferred and becomes the cathode element of the tank. As the solution in the tank is chloride of zinc, when a current is caused to pass there is deposited metallic zinc on the cathode. This metallic zinc, it has been found, hastens the reduction of the lead chloride of the cathode to a metallic state or condition and remains—that is to say, the zinc—in the solution, and thus it may be used over and over again. The retaining medium for the plate or block of lead during its aforesaid treatment, as well as during its use as a battery element, preferably consists of a casing or covering of woven or braided asbestos or analogous material.

In the practice of the present invention it is preferred that the lead plates or elements in the first instance should be simply a series of rods or wires. When the plates are in the form of blocks or plates of lead, as in the first instance mentioned, the asbestos will be cut in lengths and suitably applied thereto, and the lead in a molten state poured into suitable molds and the lengths of asbestos subsequently caused to surround or envelop the same. While in the latter case the asbestos will be braided or otherwise caused to surround the lead wires or rods, and the rods or wires then preferably formed into a series of loops with a single conductor therefor, each series of the rods or wires with the woven or braided asbestos around them constituting a plate. The method and manner hereinbefore described of constructing the plates applies more particularly to the peroxide plates; but the asbestos covering is retained and effectually prevents disintegration of the peroxide plates after continuous action in use as a storage-battery.

Having fully described the nature of the invention, and pointed out the particular features thereof, I will now refer to the accompanying drawings, illustrating the mode of treating such materials for the production of a battery plate or element such as hereinbefore described, and showing a complete battery for use, and in which—

Figure 1 is a perspective view of a tank, showing two plates embodying the features of my invention, arranged as anodes and cathodes therein, immersed in a suitable solution, and this view illustrating a preferred mode of carrying my invention into effect. Fig. 2 is a vertical section through a tank showing a plate composed of a series of depending blocks of lead or analogous material, partly in elevation and partly in section, to more fully illustrate the mode and extent to which each block or rod of the series constituting the plate is penetrated, and showing also the central core or body of ordinary lead undisturbed by such action to become a part of the conducting means of the plate in conjunction with the horizontal bar or rod burnt or otherwise applied to the upper parts of the series of blocks constituting the battery-plate. Fig. 3 is a similar view of a modified form of plate embodying the particular features of my invention. Fig. 4 is a sectional view of a complete cell on different lines, but at right angles to the plates, the said view showing two systems of battery plates or elements embodying the features of my invention mounted in said cell and in forms adapted as such for use as a complete secondary or storage battery; and Fig. 5 is a similar view showing modifications of the plates or elements.

Referring to the drawings, *a* is a tank constructed of any suitable material and of any preferred form.

*b* is a suitable solution contained in said tank, and preferably composed of dilute chloride of zinc.

*c* are the series of blocks, rods, or wires of lead or analogous material enveloped or incased in a covering or case *d*, preferably composed of woven or braided asbestos or analogous material.

*e* is a conductor burnt or otherwise applied to the tops of the series of blocks, rods, or wires *c*, constituting the respective plates.

*f*, Figs. 2 and 3, represents in section the blocks or rods penetrated or transformed by the electrolytic action permitted to take place in the tank *a*, and converted by such action into a chloride or salt state or condition, and then by a simple reversal reduced to a soft spongy or porous metallic condition.

$g$ represents the internal body or solid core maintained free from such action, and in its normal state or condition as metallic lead, and in such state or condition becomes a good conductor in the subsequent use of the plate as an element of a secondary or storage battery.

The method of carrying my invention into effect is as follows: The plate or anode designated in Fig. 1 by the letter $f'$, mounted in the tank $a$, after the passing of a current for a required time becomes coated on the surface of the lead beneath the asbestus or analogous outer woven or braided covering or casing with a layer of chloride of lead ($PbCl_2$) and to the required depth thereof. It is then removed and replaces the plate or cathode designated by the letter $f^2$, in the tank $a$, which by this time has been reduced as far as the internal core or body thereof to a porous or soft spongy metallic state or condition for use, and so on in regular succession and in a similar manner plates to be treated are placed in the tank $a$, immersed in the solution composed preferably of dilute chloride of zinc for the aforesaid treatment, the solution being constantly recovered in the manner hereinbefore fully described.

In Fig. 4 is illustrated a complete cell showing a system of positive plates $f'$ embodying the particular features of my present invention mounted in the cell in a suitable solution with a system of negative plates $f^3$ of any suitable form or shape and condition.

In Fig. 5 is illustrated a complete cell showing two systems of plates $f'$ and $f^2$, mounted therein, in dilute sulphuric acid. It will be observed that the woven or braided asbestus or analogous fibrous material casing or covering $d$ of each of the plates serves not only to support the spongy or porous metallic portion thereof, but also constitutes a most efficient insulating means between the respective plates constituting said two systems mounted in the cell.

In the practice of the present invention it has been demonstrated that not only very cheap and exceedingly durable battery-plates are produced by the method hereinbefore described, but a most efficient, economical, and lasting battery is obtained and one in which disintegration of the elements does not take place in the use thereof, and many other deleterious effects are obviated that were incident to batteries as hitherto employed for storing up electric energy.

Instead of employing chloride of zinc for the solution during the converting stage of the method of producing the plates, chloride of iron may also be used with good results.

Having thus described the nature and objects of my invention, what I claim as new, and desire to secure by Letters Patent, is—

1. A battery plate or element having a metal core or internal conducting body with an integral spongy or porous metallic surface and inclosed in a casing or covering of woven or braided fibrous material or materials, substantially as described.

2. A battery plate or element composed of rolled or cast lead, spongy or porous, to the internal core or body thereof and inclosed within woven or braided fibrous material, substantially as described.

3. A battery plate or element composed of lead, porous or spongy, to the internal metallic core or body thereof and incased in woven or braided asbestus, substantially as described.

4. A battery plate or element composed of a series of rods, bars, or wires of cast or rolled lead covered with woven or braided asbestus, and the wires, bars, or rods constituting the plate, porous or spongy, to the internal core or body thereof, substantially as described.

5. A battery plate or element composed of a series of blocks, bars, or wires of cast or rolled lead incased in woven or braided insulating material, and the said incased wires, bars, or blocks to the integral metal core in a soft spongy or porous metallic state, substantially as described.

6. A battery plate or element composed of blocks, rods, or wires of cast or rolled lead incased in woven or braided asbestus, and the said blocks, rods, or wires, porous or spongy, to the integral core or conducting metallic body thereof, substantially as described.

7. The combination, in a secondary or storage battery, of a cell, a suitable electrolyte, and two systems of plates or elements composed of blocks, bars, or wires incased in woven or braided asbestus or analogous fibrous material mounted in said cell, and the said wires, blocks, or bars having a spongy or porous surface to the internal and integral metallic core thereof, and bars burnt or otherwise applied to the upper parts of said plates, substantially as and for the purposes described.

In witness whereof I have hereunto set my signature in the presence of two subscribing witnesses.

STANLEY CHARLES CUTHBERT CURRIE.

Witnesses:
HERMANN BORMANN,
THOMAS M. SMITH.